United States Patent [19]

Inui et al.

[11] Patent Number: 4,499,476
[45] Date of Patent: Feb. 12, 1985

[54] TRANSFER TYPE HEAT SENSITIVE RECORDING APPARATUS

[75] Inventors: Toshiharu Inui; Masami Kurata; Hisao Nakajima; Takashi Ohmori, all of Kanagawa, Japan

[73] Assignee: Fuji Xerox Co., Inc., Tokyo, Japan

[21] Appl. No.: 372,355

[22] Filed: Apr. 27, 1982

[30] Foreign Application Priority Data

Apr. 30, 1981 [JP] Japan .................................. 56-65486

[51] Int. Cl.³ ..................... G01D 15/10; G01D 15/24; B65H 25/28; B65H 59/00
[52] U.S. Cl. ............................... 346/76 PH; 346/136; 242/75.45; 242/75.51
[58] Field of Search .................. 346/136, 138, 76 PH; 242/75.45, 75.51

[56] References Cited

U.S. PATENT DOCUMENTS

| 2,365,691 | 12/1944 | Fodor | 242/75.51 |
| 2,750,921 | 6/1956 | Purdy | 242/75.45 X |
| 3,727,856 | 4/1973 | Kitch | 242/75.45 X |
| 4,195,937 | 4/1980 | Baran | 346/76 PH X |

Primary Examiner—George H. Miller, Jr.
Attorney, Agent, or Firm—Sughrue, Mion, Zinn, Macpeak, and Seas

[57] ABSTRACT

A heat sensitive recording apparatus using an ink donor sheet in the form of a continuous band includes a device for detecting and correcting the tension applied to the band so as to prevent creases, etc. from being formed therein.

6 Claims, 3 Drawing Figures

TRANSFER TYPE HEAT SENSITIVE RECORDING APPARATUS

BACKGROUND OF THE INVENTION

This invention concerns a transfer type heat sensitive recording apparatus comprising a mechanism for controlling the tension of an ink donor sheet.

In an apparatus of this type information is recorded by overlaying a heat recording medium supplied with a heat transfer type (heat fusible or sublimating) ink and a recording sheet, and selectively supplying heat from the side of the heat recording medium to thereby transfer the fused or sublimated ink to the recording paper.

FIG. 1 schematically shows the structure of a heat sensitive recording apparatus using, as a heat recording medium, an elongate ink donor sheet having ink on one surface of a thin substrate paper. In the apparatus, the ink donor sheet 2 delivered from a feed roll 1 is pressed by a back roll 4 against a thermal head 8. When a recording paper 9 proceeds between the back roll 4 and the sheet 2 along a path indicated by a dotted line 11 and is passed between the back roll 4 and the thermal head 8, heat transfer recording is conducted. As the recording paper, after recording, proceeds in the direction of a common line tangent to the back roll 4 and a drive roll 5, it is separated from the ink donor sheet 2. The separated recording paper is discharged from the apparatus, whereby heat transfer recording is completed.

The heat sensitive recording apparatus of the type supplying an ink donor sheet from a feed roll has advantages features as compared with an apparatus in which recording is carried out by transporting individually cut ink donor sheets and recording paper while overlaying them, in that (1) no manual separation of the ink donor sheet from the recording paper is necessary and (2) running costs for the ink donor sheet can be reduced. In the apparatus using such a feed roll, however, since the ink donor sheet is transported by itself, creasing may be caused in the sheet thereby rendering it partially impossible to achieve heat transfer recording. Specifically, since the ink donor sheet is made extremely thin to increase the efficiency of the heat transfer, undulations are caused in the surface of the sheet if the tension thereof becomes nonuniform. When the ink donor sheet in this state is pressed against the thermal head, creasing can occur to hinder the ink transfer.

In view of the above, as shown in the conventional device of FIG. 1, a brake member 12 is placed in frictional contact with the outer circumference of the feed roll 1 to provide the ink donor sheet 2 with back tension, and a slip clutch is disposed on the take-up roll 7 so that the ink donor sheet 2 may not be placed under excess tension.

However, this apparatus still involves undesired problems. For example, referring to the brake member 12, since the braking force thereof does not change, the back tension is increased as the diameter for the feed roll is decreased during use. The situation is the same for the slip clutch, and the tension of the ink donor sheet 2 is varied with the change in the diameter of the take-up roll 7. Accordingly, tension of the ink donor sheet cannot be adequately corrected in practice, whereby creasing may still occur in the ink donor sheet 2, and expansion or contraction may result in the recorded images.

SUMMARY OF THE INVENTION

This invention has been accomplished in view of foregoing, and the object thereof is to provide a transfer type heat sensitive recording apparatus capable of maintaining the tension on the ink donor sheet approximately constant irrespective of the changes in the diameters of the feed roll or the take-up roll during use. The foregoing object is attained according to the invention by a transfer type heat sensitive recording apparatus which includes a detection means for detecting changes in the tension of the ink donor sheet, and a tension correction means operating in dependence upon the changes in the detected tension.

DETAILED DESCRIPTION OF THE PREFERRED EMBODIMENTS

Figure 1:
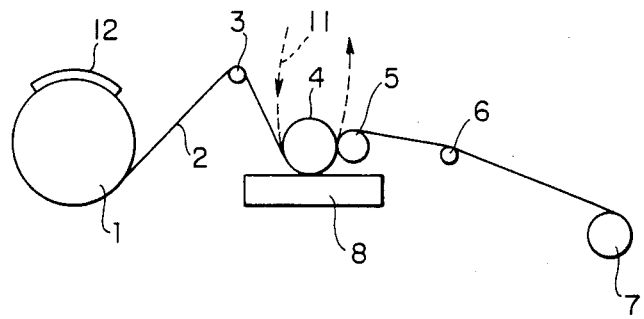
FIG. 1 is a schematic structural view of a conventional transfer type heat sensitive recording apparatus.
Figure 2:
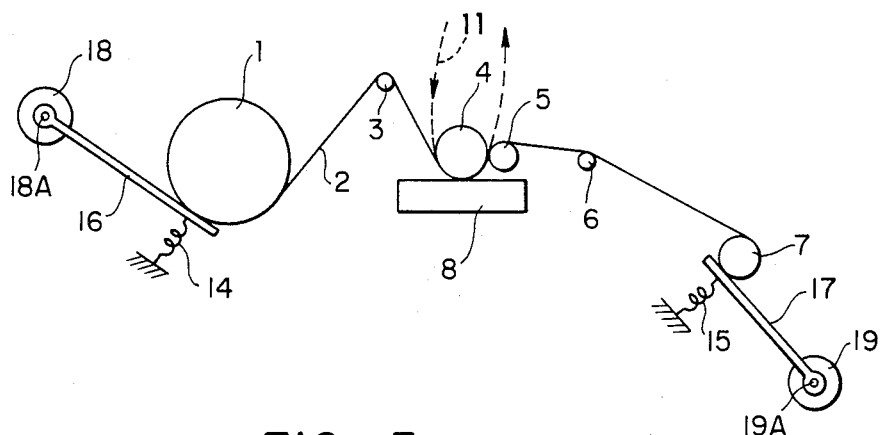
FIG. 2 is a schematic structural view of a transfer type heat sensitive recording apparatus according to one embodiment of this invention.

In FIG. 2, wherein like components as in FIG. 1 are represented by the same reference numerals, end portions of actuators 16, 17 are lightly engaged by way of compression springs 14, 15 to the outer circumferences of the feed roll 1 and the take-up roll 7, respectively. The other end portions of the actuators 16, 17 are secured to the rotary shafts 18A, 19A of variable resistors 18, 19 which are respectively fixed to a stationary part (not shown). The variable resistors 18, 19 are rotary type carbon resistors whose resistance values are adapted to vary linearly in proportion to the angle of rotation of the rotational shafts 18A, 19A. Accordingly, if the diameter of the feed roll 1 or the take-up roll 7 is changed, the actuator 16 or 17 is rotated depending thereon and the change is detected as a variation in the resistance value of the variable resistor 18 or 19.

Figure 3:
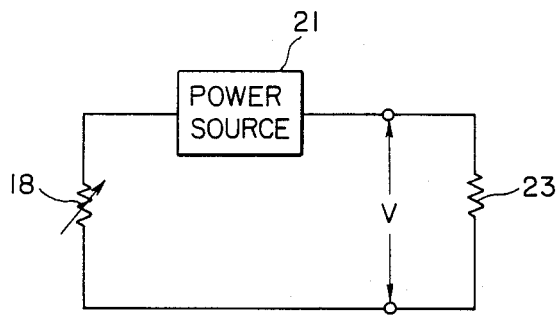
FIG. 3 is a circuit diagram of a control circuit employed in this embodiment.

FIG. 3 shows a control circuit for controlling the back tension of the feed roll based on the resistance value thus detected. The control circuit comprises the variable resistor 18 and an electromagnetic brake 23 and connected in series with a constant voltage source 21. The electromagnetic brake 23 is adapted to apply a braking force to a rotational shaft (not shown) of the feed roll 1. The resistance value of the variable resistor 18 and the resistance value of the electromagnetic brake 23 will be represented by R and r, respectively. When the diameter for the feed roll 18 is large, since the rotational shaft 18A of the variable resistor is scarcely rotated in the counter-clockwise direction, its resistance value R is relatively small. Then, since the voltage drop across the variable resistor 18 is low, a relatively high voltage is applied to the electromagnetic brake 23, whereby a greater braking force is exerted on the feed roll 1.

As the diameter of the feed roll 18 decreases, the rotational shaft 18A gradually rotates counter-clockwise in the drawing. The voltage drop across the variable resistor 18 is increased correspondingly, whereby the voltage applied to the electromagnetic brake 23 is lowered. Since an approximately proportional relationship is maintained between the current flowing to the electromagnetic brake and the braking force thereof, the braking force exerted on the feed roll 1 is decreased as the voltage applied to the electromagnetic brake 23 lowers, whereby the tension of the ink donor sheet 2 can be maintained approximately constant.

The tension of the take-up roll 7 is controlled by a control circuit operating on a similar principle. In this case, the variable resistor 19 and an electromagnetic clutch (not shown) connected to the take-up roll 7 are connected to a constant voltage source. Since a similar proportional relationship is maintained between the current flowing through the electromagnetic clutch and the torque thereof, the tension of the ink donor sheet 2 can be mainained approximately constant irrespective of the changes in the diameter of the take-up roll 7.

According to the invention, since the tension of the ink donor sheet is maintained approximately constant, clear recording images with no color drift can be obtained in a multicolor recording apparatus using a plurality of sets of ink donor sheets.

While the change in the tension of the ink donor sheet has been detected as the change in the diameter of the feed roll or the take-up roll in this embodiment, they can of course be detected by other means, for example, as the change in the pressure of the ink donor sheet against the guide rolls 3, 6.

What is claimed is:

1. A transfer type heat sensitive recording apparatus comprising:
    a feed roll having a donor sheet supplied with a heat transfer type ink wound up into a roll;
    a recording section for selectively heating said donor sheet delivered from said feed roll in dependence upon image information, and transferring said ink onto a recording paper in contact with said donor sheet;
    a take-up roll for the recovery of said used donor sheet passing through said recording section;
    means for detecting the tension of the donor sheet transported from the feed roll to the take-up roll;
    means for correcting the tension of the ink donor sheet in accordance with the result of the detection, said tension detecting means comprising variable resistors having rotary shafts, said shafts being fixedly coupled to first ends of actuator levers, second ends of said actuator levers being in contact with said feed roll and said take-up roll, respectively, movement of said second ends of said actuator levers in response to changes in diameters of said feed roll and said take-up roll, respectively, rotating said respective rotary shafts; and
    springs for urging said second ends of said levers in contact with said feed roll and said take-up roll, a variable resistor being provided for each of said feed roll and said take-up roll, whereby an increase or decrease in the amount of donor sheet on said rolls changes a diameter of said rolls and thereby varies the resistance of said resistors.

2. An apparatus as claimed in claim 1, said tension correcting means comprising electromagnetic clutch means coupled to said take-up roll, a slipping torque of said clutch means being varied with the current applied thereto.

3. An apparatus as claimed in claim 2, said clutch means being in series with one of said resistors, whereby a voltage across said clutch is varied with a variable voltage drop across said resistor.

4. An apparatus as claimed in claim 1, wherein said tension correcting means comprises electromagnetic brake means, a braking force of said brake means being varied with the current applied thereto.

5. An apparatus as claimed in claim 4, said brake means applying a braking force to said feed roll.

6. An apparatus as claimed in claim 4, said brake means being in series with one of said resistors, whereby a voltage across said brake is varied with a variable voltage drop across said resistor.

* * * * *